United States Patent [19]

Pehr

[11] Patent Number: 4,790,452
[45] Date of Patent: Dec. 13, 1988

[54] VIAL DISPENSER

[76] Inventor: Harold T. Pehr, P.O. Box 6698, Leawood, Kans. 66206

[21] Appl. No.: 127,209

[22] Filed: Dec. 1, 1987

[51] Int. Cl.⁴ ................................................. A47F 1/08
[52] U.S. Cl. ................................. 221/303; 221/312 R
[58] Field of Search ........... 221/309, 303, 281, 312 R, 221/92; 206/515, 499, 518, 519

[56] References Cited

U.S. PATENT DOCUMENTS

| | | | |
|---|---|---|---|
| 667,081 | 1/1901 | Gentner | 222/281 X |
| 3,788,487 | 1/1974 | Dawson | 206/499 X |
| 3,841,528 | 10/1974 | Eisenberg | 206/515 X |
| 4,169,542 | 10/1979 | Miller | 221/303 |

Primary Examiner—Charles A. Marmor
Attorney, Agent, or Firm—Litman, McMahon & Brown

[57] ABSTRACT

A dispenser for vials having a body and a captive cap includes a plurality of elongate tubes mounted on a support structure such that the axis of the tubes is generally vertical. An elongate slot extends from the top of each tube to the bottom thereof. Each slot has a non-vertically aligned offset near the bottom thereof. The vials include a body which is received in the tubular member so as to nest with other vial bodies and a cap which is hingedly connected at a neck to the vial body. The slot is substantially smaller than both the diameter of the vial body and cap, but slidably receives the neck. In this manner, the bodies are received within the tubular member and the caps extend outwardly therefrom. The neck of each successive vial as same arrives at the lower end of the tubular member engages the offset and supports the associated vial as well as all of the vials thereabove, until a user rotates the lowest vial to overcome the offset at which time the lowest vial is released to the user and the upper vials remain within the tubular member. A hinge cover allows the vials to be resupplied but prevents dirt from entering the vials.

6 Claims, 1 Drawing Sheet

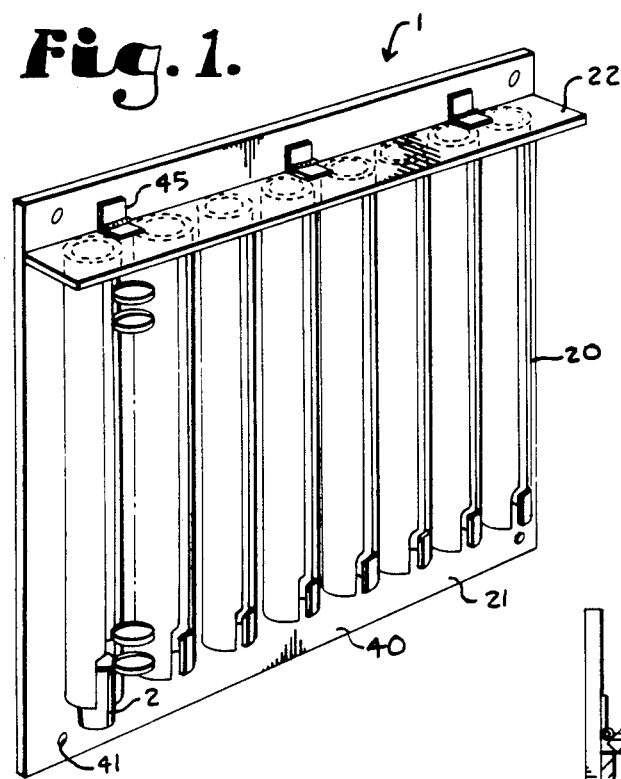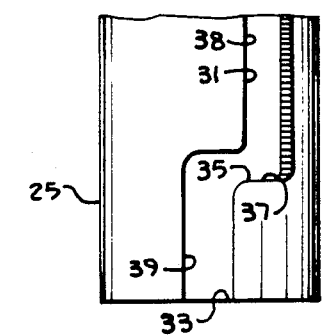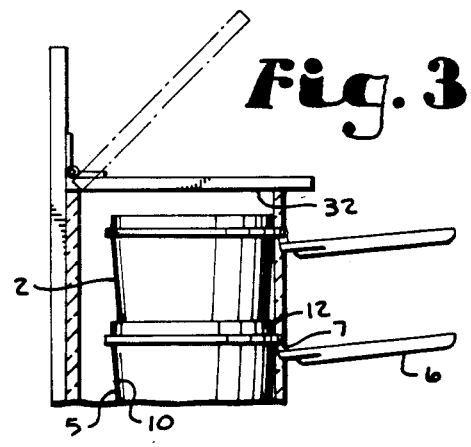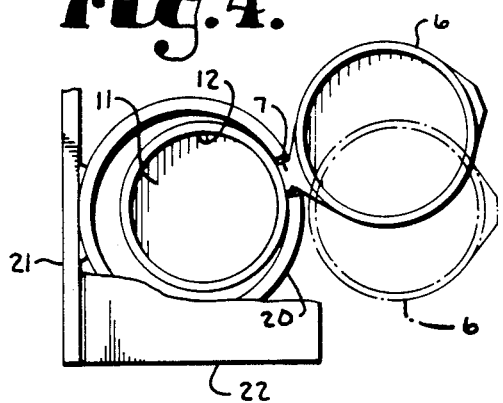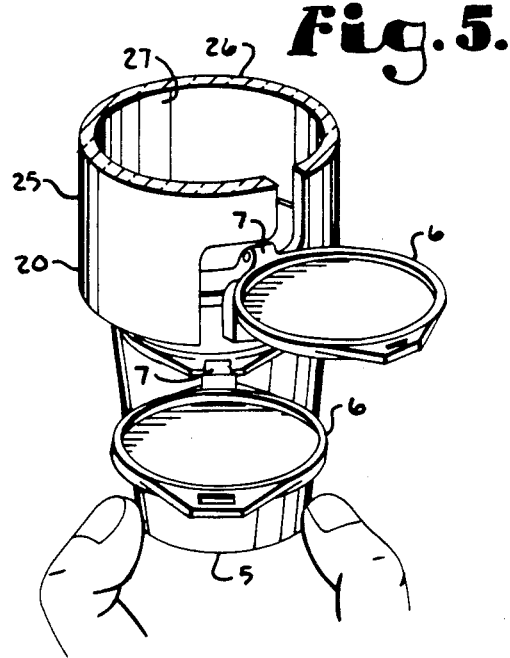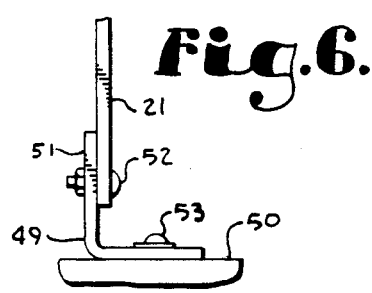

VIAL DISPENSER

BACKGROUND OF THE INVENTION

The present invention relates to a dispenser for tubular objects having an outwardly extending neck and, in particular, to a dispenser for vials having a captive cap connected to a vial body by a relatively narrow hinge or neck member and wherein the vials are stored until use by nesting together of the vial bodies.

Druggists use many vials on a daily basis in filling numerous prescriptions. Even relatively standardized vials are produced in many different dram sizes and shapes. A substantial amount of space is utilized by storage and shipment of the vials, if they are maintained as complete loose vials. In addition, the druggists waste a great deal of their time searching in bins or boxes for the appropriate vial and either removing the lid of the vial or finding the appropriate cap for the vial.

Consequently, it is desirable to provide a vial for the drug industry and the like having a captive lid, a nestable body and to further provide a dispenser for both storing and shipping such vials and easily and quickly dispensing the vials to the druggist. It is also foreseen that the dispenser should be capable of dispensing vials of different size and protecting the vials from contamination.

OBJECTS OF THE INVENTION

Therefore, the objects of the present invention are: to provide a vial for the drug industry having a nestable body and a captive cap; to provide such a vial in combination with a dispenser wherein the vial bodies are maintained in a nested configuration and from which a druggist can easily and quickly select a single vial; to provide such a dispenser having upright tubular members sized to receive vial bodies of various sizes; to provide such a dispenser having elongate slots from top to bottom of the tubular members with such slots adapted to slidably receive a neck between each of the vial bodies and caps yet be sufficiently small to prevent removal of the vial bodies radially from the tubular members; to provide such a dispenser having an offset located near the bottom of each slot; to provide such a dispenser wherein the offset supports the neck of the lowest vial in the tubular member associated therewith and thereby supports the vials above the lowest vial, yet allows rotation of the lowest vial to a non-supportive position wherein the lowest vial is easily removed from the slot and the remaining vials are thereafter supported by the offset; to provide such a dispenser including a hinge cover to allow resupply of vials to the tubular members and to prevent entry of debris into the vial bodies; and to provide such a dispenser which is relatively easy and inexpensive to manufacture and which is particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a vial dispenser and associated vials in accordance with the present invention.

FIG. 2 is an enlarged and fragmentary front elevational view of a tubular member of the dispenser, showing a slot and an offset in the slot.

FIG. 3 is an enlarged and fragmentary side elevational view of the dispenser with vials therein and with portions broken away to show detail thereof, a lid of the dispenser is also shown in phantom in a partly raised position.

FIG. 4 is an enlarged and fragmentary top plan view of the dispenser showing a tubular member thereof and a vial in a supported position, also showing the vial in a non-supported position in phantom.

FIG. 5 is an enlarged and fragmentary perspective view of a tubular member of the dispenser showing a pair of vials with one of the vials in a non-supported orientation thereof and the other vial being in a supported orientation thereof.

FIG. 6 is a fragmentary side elevational view of a modified dispenser showing a bottom edge of the modified dispenser being supported by a bracket attached to a horizontal surface.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a dispenser for vials 2 in accordance with the present invention.

Each of the vials 2 include a body portion 5, a lid or cap 6 and a neck or hinge member 7 captively connecting the cap 6 to the body portion 5. Each vial body portion 5 is a container or closure forming a complete enclosure when the cap 6 is placed thereover. The body portion 5 includes a circumferential side wall 10 enclosed at a lower end thereof by a bottom 11 and having an upper circumferential cap mating ring 12. The body portion side walls are tapered from top to bottom such that the body portions 5 of successive vials 2 may be nested together, as is partially shown in FIG. 3, when the caps 6 are not in covering relationship to the body portions 5. Each cap mating ring 12 and cap 6 has a diameter associated therewith which is substantially larger than the width of an associated hinge member 7. Although the caps 6 are illustrated in a horizontal alignment in the drawings, it is foreseen that same may be generally eventually aligned as long as the hinge member 7 is sufficiently long to space the caps 6 outward from the dispenser 1.

The dispenser 1 comprises a plurality of elongate tubular members 20 mounted upon a support structure 21 and having a hinged lid 22.

Each of the tubular members 20 include an elongate, generally annular tube 25 having an axis which is generally vertically aligned when the dispenser 1 is in use.

Each tubular member 20 is fastened to the support structure 21 by suitable glue or the like. Each tube 25 has a relatively thin outer wall 26 and a relatively large diameter center bore 27. Each tube 25 is open at opposite ends 32 and 33 thereof.

Each tube 25 includes an elongate slot 31 extending from the tube top end 32 to the tube bottom end 33. Near the tube bottom end 33, the slot 31 has an offset 35. Whereas the remainder of the slot 31 is generally vertically aligned, the offset is non-vertically aligned and, in the illustrated embodiment, is horizontally aligned. The offset 35 thus forms a shelf 37 beneath a majority of the slot 31. In the illustrated embodiment, a portion 38 of the slot 31 above the shelf 37 is generally vertically aligned and a portion 39 of the slot 31 below the shelf 37 is also generally vertically aligned but the two portions 38 and 39 are not colinear. The slot 31 is sized so as to be sufficiently wide to slidably receive the vial neck or hinge member 7, but to prevent the vial body 5 from passing therethrough. The offset 35 is also sufficiently sized to be of enough height so as to be able to rotate the hinge member 7 circumferentially along the shelf 37 without substantial interference from the slot offset 35.

In the illustrated embodiment of FIGS. 1 through 5, the support structure 21 is a planar slab 40 to which the various tubular members 20 are secured. As shown in FIG. 1, the tubular members 20 are positioned in side-by-side relationship along one face of the planar slab 40. The slab 40 includes apertures 41 therein for mounting the dispenser 1 on a wall by use of suitable fasteners.

The lid 22 is connected to the slab 40 by a plurality of hinges 45 which allow the lid 22 to be rotated from a horizontal position wherein the lid is in covering relationship to the tubular members 20 and, consequently, to the vial body portions 5, to an upward position wherein the lid 22 no longer interferes with placement of vials 2 within the tubular members 20, so as to allow refill of the tubular members 20. It is noted that the tubular members 20 of the present embodiment are all of approximately the same diameter, as the tubular members 20 of the present invention have been sized large enough to hold a variety of different vial sizes. It is foreseen that tubular members of different sizes could also be incorporated into the dispenser 1 to accommodate vials of different sizes.

In addition, where the vials 2 are not used frequently or where there is a great amount of dirt and other debris in the air it is possible to enclose the dispenser 1 in a suitable cabinet having an easy open door or an open bottom to allow druggists to easily remove vials 2 from the dispenser 1.

In use, the dispenser 1 is filled with vials 2 by placing the vials 2 in nesting relationship within the various tubular members 20. The bottom vial 2 in each tubular member 20 is allowed to rest such that the hinge member 7 thereof is supported by the shelf 37 formed by the slot offset 35. When a druggist desires to utilize a vial 2, the lowest vial of the particular size desired is rotated about a vertical axis such that the associated hinge member 7 moves along the shelf 37 to the left as seen in FIGS. 2 and 5. This is also shown by the movement from solid lines to phantom lines in FIG. 4. When the hinge member 7 is no longer supported by the shelf 37, the bottom vial 2 is then free to drop along the bottom portion 39 of the slot 31 and to be discharged from the tube bottom end 33. The next successive vial 2 in the tubular member 20 then descends such that the hinge member 7 thereof is supported by the shelf 37 and the remaining vials thereabove are also supported by the shelf 37. It is noted that the present dispenser 1 may also be utilized for dispensing objects other than vials preferably having a tubular body and necessarily having an outwardly projecting neck.

Illustrated in FIG. 6 is an alternative device 49 for mounting the dispenser 1 and, in particular, for mounting the dispenser 1 on a horizontal surface 50. An angle bracket 51 is provided which is attached to apertures 41 and to the surface 50 by suitable fasteners 52 and 53.

It is to be understood that while certain forms of the present invention have been illustrated and described herein, it is not to be limited to the specific forms or arrangement of parts described and shown.

What is claimed and desired to be secured by Letters Patent is as follows:

1. A tubular dispenser in combination with a plurality of vials; each of said vials having a cap secured to a body by a hinge member projecting radially outward from said body; said dispenser comprising:
   (a) an elongate tubular member sized to slidably receive said vial bodies in nested relationship to one another having a central axis and an outer wall;
   (b) support structure for mounting said member such that said axis is generally vertically aligned;
   (c) said tubular member including an elongate slot extending between opposite ends of said tubular member; said hinge member being smaller in width than said slot and each of said caps and said bodies being substantially larger in width than said slot; said slot being sized to receive the hinge member between the body and cap of each of said vials and said slot extending between the interior and exterior of said tubular member wall; and wherein:
   (d) said slot includes a non-vertical offset near a lower end of said tubular member; said offset supporting said hinge member of a lowest of said vials; each of said caps positioning their respective hinge member, when their respective vial body is in said that their hinge member will engage said offset when said vial is the lowest of said vials, such as to hold vials positioned thereabove while not urging said cap against said tubular member, but adapted to allow a user to selectively rotate a single vial at said offset and then remove said single vial from said dispenser.

2. The dispenser in accordance with claim 1 wherein:
   (a) said tubular member is a first tubular member; and including
   (b) a second tubular member supported by said support structure adjacent to said first tubular member.

3. The dispenser in accordance with claim 1 including:
   (a) a cover member hingedly attached to said support structure; said cover member covering said tubular member when in a first position thereof and pivotal to a second position to allow addition of vials to said tubular member.

4. The dispenser in accordance with claim 1 in combination with:
   (a) a plurality of vials; each of said vials having bodies nestable within said tubular member and caps extending outwardly of said tubular member; said caps being attached to respective bodies by a hinge member; said hinge members being supported by said slot offset until the lowest vial is rotated by a user and removed from said tubular member.

5. In combination, a dispenser and vial system comprising:
   (a) a plurality of vials; each vial having a body portion, a cap, and a hinge member captively connecting said body portion to said cap; said hinge member being substantially smaller in width than an hingedly connecting said body portion and said cap;
   (b) an elongate tubular member for receiving internally the vial body portions and having an outer wall; said tubular member being generally vertically aligned;
   (c) said tubular member including an elongate slot in said wall extending from the top thereof to the bottom thereof and from an inside surface to an outside surface of said tubular member wall; said elongate slot having an offset near the bottom thereof so as to form a shelf below the portion of said slot above said offset; said slot receiving each of said hinge members while respective vial body portions are received in said tubular member and while respective caps are connected to said body portion by said hinge member but are located outside said tubular member and said slot; said slot being sized sufficiently large to allow said hinge members to be slidably received therein, said slot being sized sufficiently small to prevent said vial body portions from being drawn therethrough and said slot being sized relative to said caps such that each of said caps effectively positions their respective hinge member, when their respective body portion is in said tubular member, such that said respected hinge member is supported by said offset in such a manner that said cap is free to slide along an outside surface of said tubular member;
   (d) whereby said vial body portions are receivable in a stacked configuration within said tubular member, said hinge member of each vial being positioned within said slot and the caps associated with each of said vials being outside of said tubular member, such that the hinge member of the lowest of said vials within said tubular member rests upon and is supported by said offset; said lowest vial supporting the vials thereabove until such time as a user rotates the lowest of said vials sufficiently such that the lowest of said vials is no longer supported by said shelf and thereafter said lowest vial is withdrawable from the bottom end of said tubular member and vials remaining within said tubular member are thereafter supported by said shelf.

6. The system according to claim 5 wherein:
   (a) said vial body portions are tapered from top to bottom such that stacked body portions without lids thereon nest together.

* * * * *